(12) United States Patent
Jiang et al.

(10) Patent No.: US 11,340,827 B2
(45) Date of Patent: May 24, 2022

(54) METHOD, DEVICE, AND PROGRAM PRODUCT FOR MANAGING STORAGE SPACE IN STORAGE SYSTEM

(71) Applicant: EMC IP Holding Company LLC, Hopkinton, MA (US)

(72) Inventors: Changxu Jiang, Chengdu (CN); Xu Chen, Chengdu (CN); Zhenzong Jiang, Chengdu (CN); Peilei Chen, Chengdu (CN); Hailan Dong, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 41 days.

(21) Appl. No.: 16/879,094

(22) Filed: May 20, 2020

(65) Prior Publication Data
US 2021/0124521 A1 Apr. 29, 2021

(30) Foreign Application Priority Data
Oct. 29, 2019 (CN) .......................... 201911038706.6

(51) Int. Cl.
*G06F 3/06* (2006.01)
*G06F 11/30* (2006.01)

(52) U.S. Cl.
CPC ............ *G06F 3/0653* (2013.01); *G06F 3/067* (2013.01); *G06F 3/0614* (2013.01); *G06F 3/0631* (2013.01); *G06F 11/3075* (2013.01)

(58) Field of Classification Search
None
See application file for complete search history.

(56) References Cited

U.S. PATENT DOCUMENTS

| | | | |
|---|---|---|---|
| 7,558,919 B1 | 7/2009 | Yochai et al. | |
| 7,607,037 B1 | 10/2009 | Lecrone et al. | |
| 8,150,877 B1 | 4/2012 | Wood et al. | |
| 9,282,053 B1 | 3/2016 | Naamad et al. | |
| 9,479,616 B2 * | 10/2016 | Koifman ............. | G06F 12/1408 |
| 9,866,573 B2 | 1/2018 | Kozlovsky et al. | |
| 10,229,127 B1 | 3/2019 | Shang et al. | |
| 2017/0244926 A1 * | 8/2017 | Kotab ................ | H04N 21/2747 |

\* cited by examiner

*Primary Examiner* — Brian R Peugh
(74) *Attorney, Agent, or Firm* — BainwoodHuang

(57) ABSTRACT

A group of state data of storage space in a storage system is collected according to a predetermined time interval, the group of state data being collected at a group of time points, respectively, and the group of time points being divided according to the predetermined time interval. The group of state data is compared with a threshold condition of the storage system, the threshold condition representing that storage space in the storage system is to be exhausted. An association relationship between a state of storage space in the storage system and a future time point is generated based on the group of state data in accordance with determining at least one state data in the group of state data satisfies the threshold condition. A state estimate of storage space in the storage system at a specified future time point is obtained based on the generated association relationship.

20 Claims, 8 Drawing Sheets

METHOD, DEVICE, AND PROGRAM PRODUCT FOR MANAGING STORAGE SPACE IN STORAGE SYSTEM

CROSS-REFERENCE TO RELATED APPLICATION

This application claims priority to Chinese Patent Application No. CN201911038706.6, on file at the China National Intellectual Property Administration (CNIPA), having a filing date of Oct. 29, 2019, and having "METHOD, DEVICE, AND PROGRAM PRODUCT FOR MANAGING STORAGE SPACE IN STORAGE SYSTEM" as a title, the contents and teachings of which are herein incorporated by reference in their entirety.

FIELD

Various implementations of the present disclosure relate to the management of storage systems, and more specifically, to a method, device and computer program product for managing usable storage space in a storage system.

BACKGROUND

With the development of data storage technology, various data storage devices provide increasingly large data storage capacity to users, and their data access speed has also been significantly increased. With the increase of data storage capacity, users also impose new demands on management of usable storage space in storage systems. At this point, it has become a research focus to provide more information about storage space in a storage system to users and/or administrators of the storage system.

SUMMARY

Therefore, it is desirable to develop and implement a technical solution for managing a storage system more effectively. It is desired that the technical solution be compatible with an existing application system to manage a storage system more effectively by reconstructing configurations of the existing storage system.

According to a first aspect of the present disclosure, a method is provided for managing storage space in a storage system. In the method, a group of state data of storage space in the storage system is collected according to a predetermined time interval, respectively, the group of state data being collected at a group of time points, respectively, and the group of time points being divided according to the predetermined time interval. The group of state data is compared with a threshold condition of the storage system, the threshold condition represents that storage space in the storage system is to be exhausted. An association relationship between a state of storage space in the storage system and a future time point is generated based on the group of state data in accordance with determining at least one state data in the group of state data satisfies the threshold condition. A state estimate of storage space in the storage system at a specified future time point is obtained based on the generated association relationship.

According to a second aspect of the present disclosure, a device is provided for managing storage space in a storage system. The device includes: at least one processor; and a memory coupled to the at least one processor, the memory having instructions stored thereon, the instructions, when executed by the at least one processor, causing the device to perform acts. The acts include: collecting a group of state data of storage space in the storage system according to a predetermined time interval, respectively, the group of state data being collected at a group of time points, respectively, and the group of time points being divided according to the predetermined time interval; comparing the group of state data with a threshold condition of the storage system, the threshold condition represents that storage space in the storage system is to be exhausted; generating an association relationship between a state of storage space in the storage system and a future time point based on the group of state data in accordance with determining at least one state data in the group of state data satisfies the threshold condition; and obtaining a state estimate of storage space in the storage system at a specified future time point based on the generated association relationship.

According to a third aspect of the present disclosure, a computer program product is provided. The computer program product is tangibly stored on a non-transitory computer-readable medium and includes machine-executable instructions which are used to implement a method according to the first aspect of the present disclosure.

BRIEF DESCRIPTION OF THE DRAWINGS

Through a more detailed description in the accompanying drawings, features, advantages and other aspects of the implementations of, the present disclosure will become more apparent. Several implementations of the present disclosure are illustrated schematically and are not intended to limit the present invention. In the drawings.

DETAILED DESCRIPTION OF IMPLEMENTATIONS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more detail with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

Figure 1:
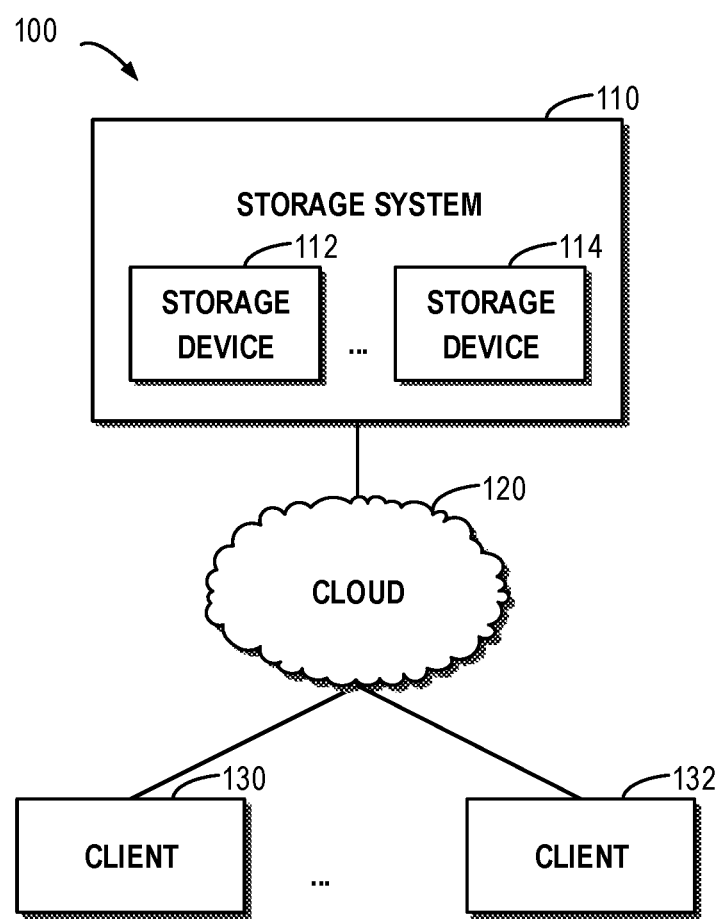
FIG. 1 schematically shows a block diagram of a storage system in which example implementations of the present disclosure may be implemented.

FIG. 1 shows a block diagram 100 of a storage system 110 in which example implementations of the present disclosure may be implemented. As depicted, the storage system 110 may be a storage system based on a cloud 120. The storage system 110 may include a plurality of storage devices 112, . . . , 114, and users of the storage system 110 may access the storage system 110 via clients 130, . . . , 132. It will be understood although illustrated in FIG. 1 is a distributed storage system 110 based on a plurality of storage devices, the storage system here may further be a centralized storage system.

It will be understood that usable storage space in the storage system 110 will reduce as a user continually writes data to the storage system 110, which leads to a shortage of storage space in the storage system 110. The user of the storage system might delete data from the storage system, and the administrator of the storage system may add a new storage device to the storage system. Although the above method may cause the storage system to have larger storage space, when the user desires to write a large amount of data to the storage system, a shortage of storage space might occur.

Technical solutions have been proposed for managing storage space in a storage system. For example, statistics may be periodically made on the size and/or usage ratio of usable storage space in the storage system, and the above information may be provided to a user and/or administrator of the storage system. However, the user and/or administrator of the storage system can only obtain current and historical states of the storage system, but have/has no idea of a future usage state of the storage system. Therefore, it is desirable to notify in advance a usage state of storage space in the storage system.

In order to solve the above drawbacks, implementations of the present disclosure provide a method for managing storage space in a storage system. In the method, an association relationship between a usage state of the storage system and a time point may be built using historical usage states of the storage system and historical time points based on machine learning technology. Further, a state estimate for the storage system at a future time point may be provided based on the built association relationship. With example implementations of the present disclosure, a future usage state of storage space in the storage system may be estimated based on historical speed at which storage space in the storage system has been consumed. Furthermore, it may be predicted when usable storage space in the storage system is to be exhausted, so as to notify in advance the user and/or administrator of the storage system to take corresponding measures. Now with reference to FIG. 2, a brief description is presented below of example implementations of the present disclosure.

Figure 2:
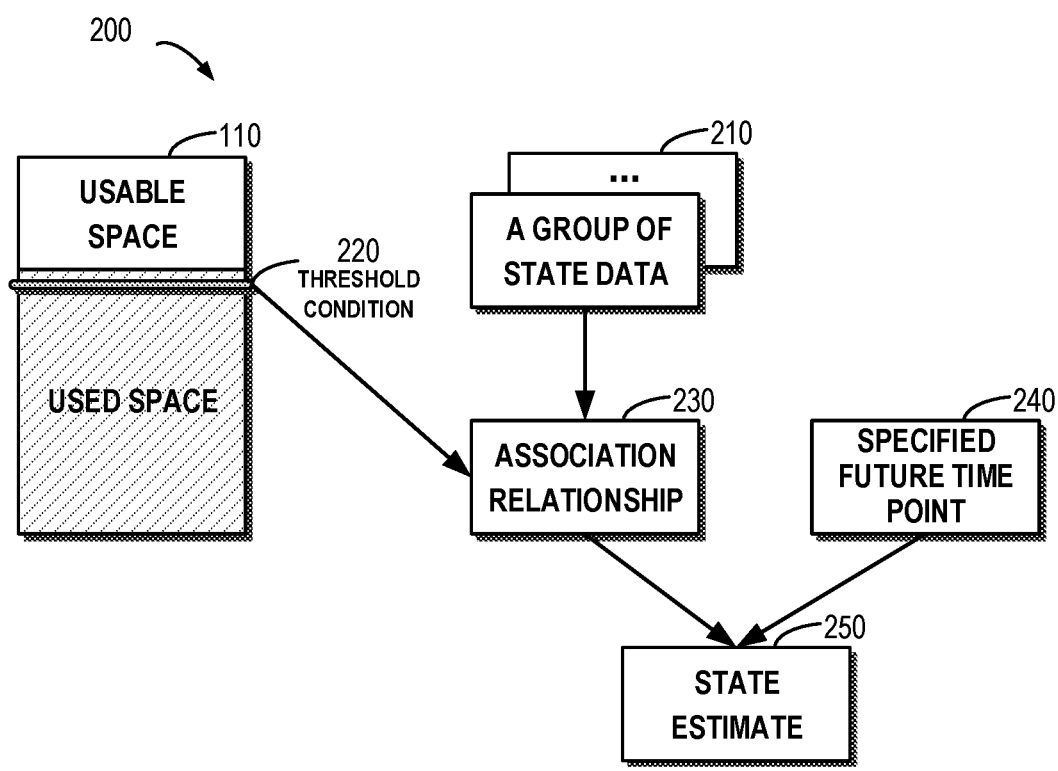
FIG. 2 schematically shows a block diagram of the process for managing storage space in a storage system according to example implementations of the present disclosure.

FIG. 2 schematically shows a block diagram 200 of the process for managing storage space in a storage system according to example implementations of the present disclosure. A usage state of the storage system 110 is as illustrated in FIG. 2, wherein a blank portion in the storage system 110 represents usage space, and a portion shown with slashes represents used space in the storage system 110. According to example implementations of the present disclosure, a threshold condition 220 is proposed. Here, the threshold condition 220 refers to a condition when storage space in the storage system is to be exhausted. For example, the threshold condition 220 may be denoted by a usage ratio of the storage system 110. In one example, the threshold condition 220 may include, for example, the usage ratio of the storage system 110 reaching 70% (or another percentage). Alternatively and/or additionally, the threshold condition 220 may further be denoted by the size of usable storage space and/or the number of slices involved in usable storage space. For example, the threshold condition 220 may be expressed as the number of usable slices in the storage system being lower than 50000.

According to example implementations of the present disclosure, state data of the storage system 110 at various time points may be collected, and an association relationship 230 may be generated based on a collected group of state data 210 when state data of the storage system 110 satisfies the threshold condition 220. The generated association relationship 230 may represent an association between a state of storage space in the storage system and a future time point, so a state estimate 250 for the storage system 110 at a specified future time point 240 may be determined based on the generated association relationship 230. More details about example implementations of the present disclosure will be described with reference to FIG. 3 below.

Figure 3:
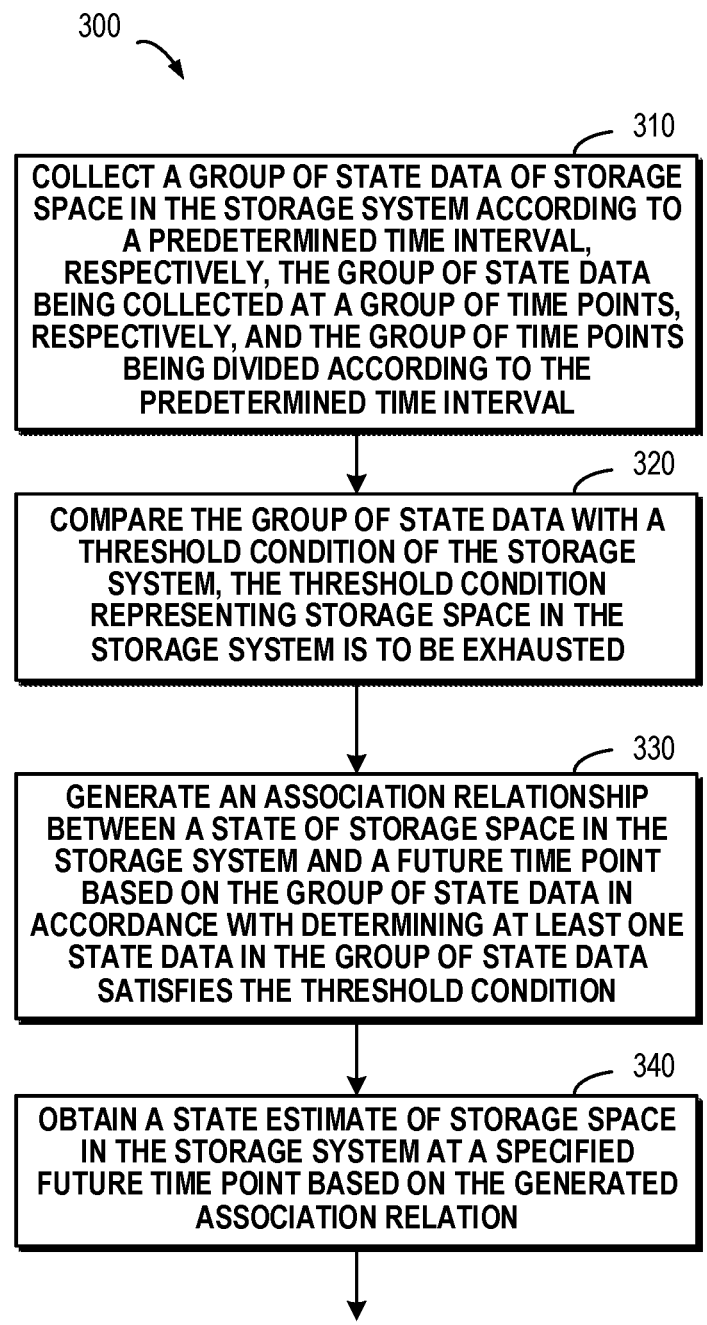
FIG. 3 schematically shows a flowchart of a method for managing storage space in a storage system according to example implementations of the present disclosure.

FIG. 3 schematically shows a flowchart of a method 300 for managing storage space in a storage system according to example implementations of the present disclosure. At block 310, a group of state data 210 of storage space in the storage system is collected respectively according to a predetermined time interval, where the group of state data 210 is collected at a group of time points, and the group of time points are divided according to the predetermined time interval. Here state data of the storage system may be collected at the predetermined time intervals in time sequence. The collected state data may be arranged in a chronological order. Here the group of state data is a group of sample data used for building the association relationship 230 based on the machine learning technology.

According to example implementations of the present disclosure, the number of samples that should be included in the group of state data may be specified first. For example, the group of state data may be denoted as a symbol D, and the number of samples that should be included in the group of state data may be denoted as an integer n. It will be understood that as the number of samples collected gradually increases, the process for collecting the group of state data may be divided into two stages. In the first stage, the amount of state data being collected is lower than the predetermined number n, so the process continues collecting state data of storage space in the storage system according to the predetermined time interval, and the collected state data of storage space is added to the group of state data. More details about the first stage will be described with reference to FIG. 4A below.

Figure 4A:
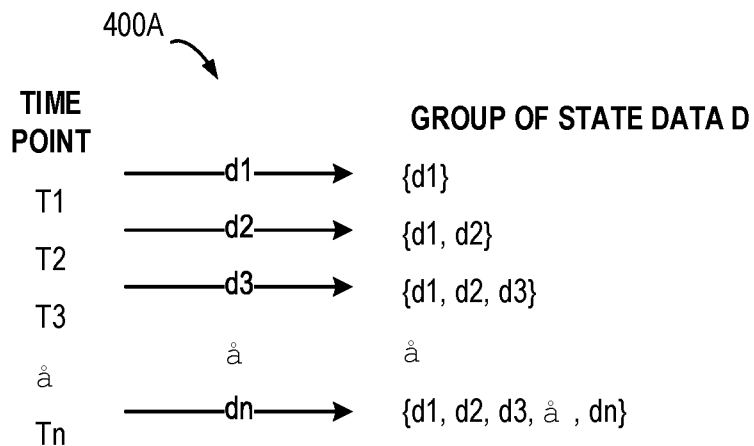
FIG. 4A schematically shows a block diagram of the process for collecting a group of state data according to example implementations of the present disclosure.

FIG. 4A schematically shows a block diagram 400A of the process for collecting a group of state data according to example implementations of the present disclosure. As depicted, the first stage relates to the process for collecting state data between time points T1 and Tn. At the time point T1, state data d1 may be collected and may be added to the group of state data D, at which point D={d1}. With the running of the storage system, at the time point T2, state data d2 may be collected and may be added to the group of state data D, at which point D={d1, d2}. From T3 to Tn, the process for collecting state data is similar. At the end of the first stage, i.e., at Tn, the group of state data D={d1, d2, d3, . . . , dn}. At this point, the amount of state data being collected reaches the predetermined number n, and afterwards, the collection process enters the second stage.

Figure 4B:
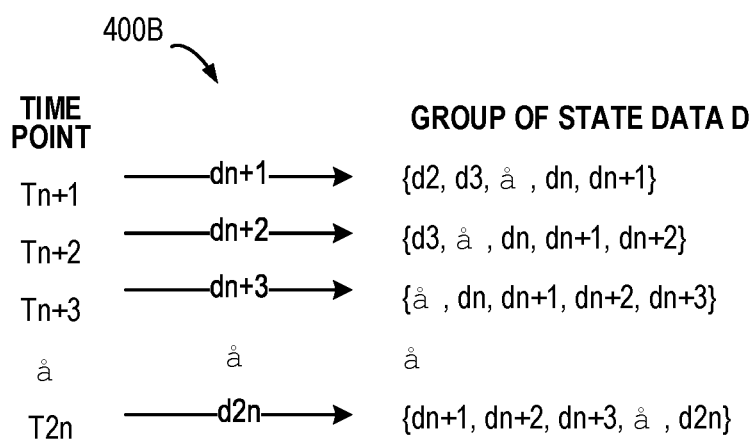
FIG. 4B schematically shows a block diagram of the process for updating a group of state data according to example implementations of the present disclosure.

According to example implementations of the present disclosure, if it is determined that the amount of the group of state data is equal to the predetermined number, then the process continues to collect states of storage space in the storage system according to the predetermined time interval. With the collected states of storage space, the group of state data is updated based on the first-in first-out rule. This process for collecting data states relates to the second stage. In the second stage, the amount of collected state data has reached the predetermined number n, and then old data in the group of state data may be updated based on the first-in first-out rule. FIG. 4B schematically shows a block diagram 400B of the process for updating a group of data according to example implementations of the present disclosure. The second stage of the process for collecting data is as shown in FIG. 4B. At a time point Tn+1, state data dn+1 may be collected. At this point the group of state data already includes n state data, i.e., d1 to dn, so the old state data d1 in the group of state data D may be replaced with the state data dn+1 based on the first-in first-out rule. The updated group of state data shows D={d2, d3, . . . , dn+1}.

At a time point Tn+2, state data dn+2 may be collected. At this point the group of state data already includes n state data, i.e., d2 to dn+1, so the group of state data D may be updated using the state data dn+2 based on the first-in first-out rule. The updated group of state data shows D={d3, . . . , dn+1, dn+2}. From subsequent Tn+3 to T2n, the process of collecting data is also similar. It will be understood although FIG. 4B merely shows the collection process between time points Tn+1 and T2n, the collection process at various time points after T2n is also similar.

Returning to FIG. 3, at block 320, the group of state data may be compared with a threshold condition of the storage system. Here the threshold condition may represent that storage space in the storage system is to be exhausted. It will be understood that the threshold condition may be set in various ways. For example, the predetermined threshold condition may be defined as used storage space in the storage system being larger than or equal to 70%. In another example, the predetermined threshold condition may be defined as usable storage space in the storage system being less than or equal to 100 TB, etc.

At block 330, if it is determined that at least one state data in the group of state data satisfies the threshold condition, an association relationship between a state of storage space in the storage system and a future time point may be generated based on the group of state data. According to example implementations of the present disclosure, the association relationship 230 may be generated based on state data which have been collected in the past time period by means of machine learning technology. It will be understood since the generated association relationship 230 is generated based on real historical state data in the past, the association relationship 230 can reflect a trend that data in the storage system is consumed in a time period, and further may be used to determine a state estimate for the storage system at a future time point.

Figure 5A:
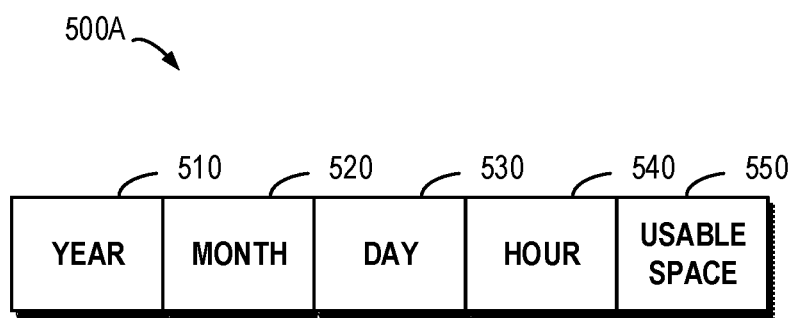
FIG. 5A schematically shows a block diagram of one example of features according to example implementations of the present disclosure.
Figure 5B:
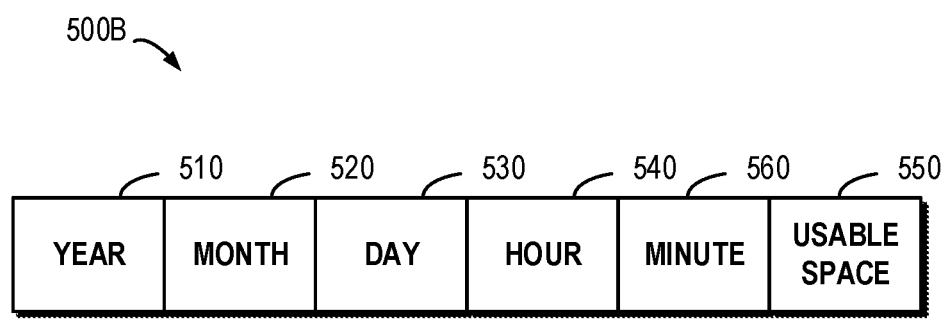
FIG. 5B schematically shows a block diagram of another example of features according to example implementations of the present disclosure.

According to example implementations of the present disclosure, in order to generate the association relationship between a state of storage space in the storage system and a future time point, a group of time features may be generated based on the group of time points, respectively. With reference to FIGS. 5A and 5B, description is presented below to more details about features. FIG. 5A schematically shows a block diagram 500A of one example of features according to example implementations of the present disclosure. As depicted, features may include two portions: 1) a time feature portion may include year, month, day, and hour as shown by attributes 510, 520, 530 and 540, respectively; 2) a state feature portion may include usable space as shown by an attribute 550.

The time feature portion may be determined based on time points when state data is collected. Suppose the state data d1 is collected at 1 of Jan. 1, 2019, then the time feature of the state data d1 may be represented as (2019, 1, 1, 1). The state feature portion may be determined based on state data. Suppose state data is represented by the unit of the number of usable slices, and state data being collected is 70000, then the state feature portion may be represented as 70000. It will be understood FIG. 5A merely shows one example of features for describing state data, and time intervals at which the state data is collected may be, for example, 1 hour. When state data is collected at another time interval, features may further adopt another data structure.

For example, FIG. 5B schematically shows a block diagram 500B of another example of state features according to example implementations of the present disclosure. In the figure, elements denoted by reference numerals 510 to 550 have the same meaning as shown in FIG. 5A, and the difference is that the time feature portion further includes a minute 560. The minute 560 may represent "minutes" in the time when state data is collected. With example implementations of the present disclosure, the state may be represented with higher precision.

According to example implementations of the present disclosure, the association relationship 230 may be trained based on the generated group of time features and group of state data. In this schematic implementation, it should be ensured that a group of state estimates for storage space in the storage system, as obtained based on the trained association relationship 230 and the group of time features, match the group of state data. For the sake of description, suppose historical state data collected between the time points T1 and T2n are recorded as below.

TABLE 1

| | | Historical State Data | | | |
|---|---|---|---|---|---|
| Identifier | Year | Month | Day | Hour | Usable Space |
| d1 | | | | | |
| d2 | | | | | |
| d3 | | | | | |
| ... | ... | ... | ... | ... | ... |
| d2n | | | | | |

In Table 1, the first column "identifier" represents identifiers of various state data, the following 5 columns represent relevant features, respectively, where "year, month, day, and hour" represent time features, and the last column "usable space" represents usable storage space in the storage system at various time points. Each state data may be stored in a vector form. As shown in Table 1, each row in this table represents a piece of state data.

Figure 6:
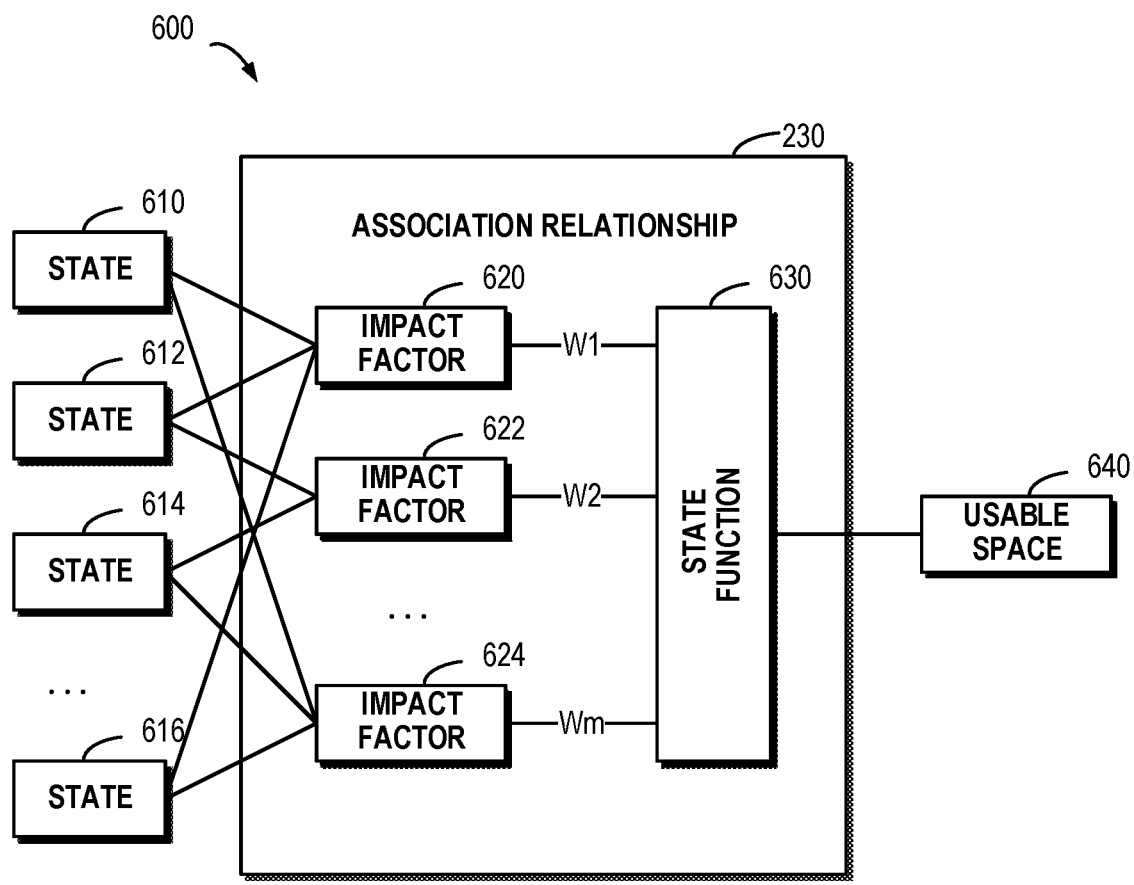
FIG. 6 schematically shows a block diagram of the process for building an association relationship between time points and states according to example implementations of the present disclosure.

Description is presented on how to determine the association relationship 230 with reference to FIG. 6. This figure schematically shows a block diagram 600 of the process for building an association relationship between time points and states according to example implementations of the present disclosure. As depicted, a plurality of impact factors 620, 622, . . . , and 624 may be set. Each impact factor may represent the impact of a corresponding attribute in a feature on one aspect of the association relationship 230, and a corresponding weight may be set for each impact factor. For example, a weight W1 may be set for the impact factor 620, W2 for 622, . . . , and Wm for 624.

A state function 630 may be constructed based on machine learning technology. It is desired that the state function 630 describe association relationships between a plurality of state data 610, 612, 614, . . . , and 616 and corresponding usable space 640. After training the association relationship 230 based on historical state data, if the state data 610, 612, 614, . . . , and 616 is inputted to the association relationship 230, respectively, the usable space 640 determined via the association relationship 230 is as consistent as possible with collected corresponding historical usable space in the storage system.

For example, suppose an impact factor (wherein xi represents the $i^{th}$ impact factor) and a corresponding weight (wherein wi represents a weight of the $i^{th}$ impact factor) are represented using Formula 1 and Formula 2, respectively, wherein an integer m (e.g., m=4 in the example of Table 1) represents the number of impact factors. At this point, a vector $X^T$ represents a group of impact factors, and a vector $W^T$ represents corresponding weights.

$$X^T = [x_1 x_2 \ldots x_m] \qquad \text{Formula 1}$$

$$W^T = [w_1 w_2 \ldots w_m] \qquad \text{Formula 2}$$

The state function 630 may be represented using Formula 3 below, wherein z represents a state function, and b represents a constant.

$$z = b + w_1 \times x_1 + w_2 \times x_2 + \ldots + w_m \times x_m \qquad \text{Formula 3}$$

$$= b + \sum_{k=1}^{m} w_k \times x_k$$

A Sigmoid function may be used as an activation function of the association relationship 230. Further, a cost function may be built to represent the difference between historical usable space in collected historical state data and the state estimate determined based on the association relationship 230. The association relationship 230 may be iteratively trained based on the above formulas by using collected historical state data, until the cost function satisfies the predetermined condition. It will be understood that the illustration above is merely a general principle for building the association relationship 230. In the context of the present disclosure, it is not intended to limit the way that the association relationship 230 is trained, but the association relationship 230 may be obtained based on various training techniques that have been developed and/or will be developed in the future.

According to example implementations of the present disclosure, the association relationship 230 may be trained using a current group of state data D at each time point. Returning to FIG. 4A, at the time point T1, the group of state data D may include the state data d1. If the state data d1 satisfies the threshold condition, then the association relationship 230 may be trained based on the state data d1. At the time point T2, the group of state data D may include the state data d1 and d2, at which point the association relationship 230 may be trained based on the state data d1 and d2. Subsequently from T3 to Tn in the first stage, in the group of state data D, at least the state data d1 satisfies the threshold condition, so the association relationship 230 needs to be updated using a current group of state data D at each time point.

With reference to FIG. 4B below, description is presented to operations in the second stage. At the time point Tn+1, the state data d1 is already replaced with the state data dn+1 based on the first-in first-out rule. At this point, based on any one of the state data d2 to dn+1 satisfying the threshold condition, it may be determined whether training continues using a current latest group of state data so as to update the association relationship 230. If none of the state data d2 to dn+1 satisfies the threshold condition, then the training operation stops, at which point the association relationship 230 is no longer updated. If any of the state data d2 to dn+1 satisfies the threshold condition, the training operation continues so as to update the association relationship 230.

It will be understood that the storage system 110 will face a potential risk of a shortage of storage space only when usable storage space in the storage system 110 is lower than the predetermined threshold. Therefore, the association relationship 230 only needs to be updated when the storage system 110 is faced with the potential risk. When there is large storage space in the storage system 110 (i.e., usable storage space does not satisfy the threshold condition), the process may stop updating the association relationship 230 based on a newly collected group of state data.

According to example implementations of the present disclosure, the process stops updating the association relationship in accordance with determining that none in the group of state data satisfies the predetermined condition. Specifically, each state data in the group of state data may be compared with the threshold condition one by one, so as to determine whether the storage system 110 is faced with the potential risk. If none of state data satisfies the predetermined condition, then the process may no longer update the association relationship, but may only continue to collect state data and monitor whether collected state data satisfies the threshold condition. Once collected state data satisfies the threshold condition, then the process restarts updating the association relationship 230 based on a latest group of state data.

With example implementations of the present disclosure, on the one hand, the process may start to update the association relationship 230 only when the storage system 110 is faced with the potential risk, so as to ensure that the trend that usable storage space is to be exhausted is determined based on newly collected state data. On the other hand, when the storage system 110 no longer has the potential risk, the process may stop updating the association relationship so as to reduce various computing resources and time overheads associated with the updating.

Returning to FIG. 3, at block 340, a state estimate for storage space in the storage system at a specified future time point may be obtained based on the generated association relationship. According to example implementations of the present disclosure, where the association relationship 230 has been obtained, it may be specified at which future time point a state estimate is expected to be obtained, and further the corresponding state estimate may be obtained based on a time feature of the time point.

According to example implementations of the present disclosure, a time feature corresponding to the specified time point may be obtained according to the method for obtaining a time feature in the training stage. For example, where a time feature including year, month, day and hour as shown in FIG. 5A is used in the training stage, the specified time point may be converted to a time feature described in the format of year, month, day and hour. Subsequently, the state estimate at the specified time point may be obtained by inputting the time feature to the well trained association relationship 230.

Figure 7:
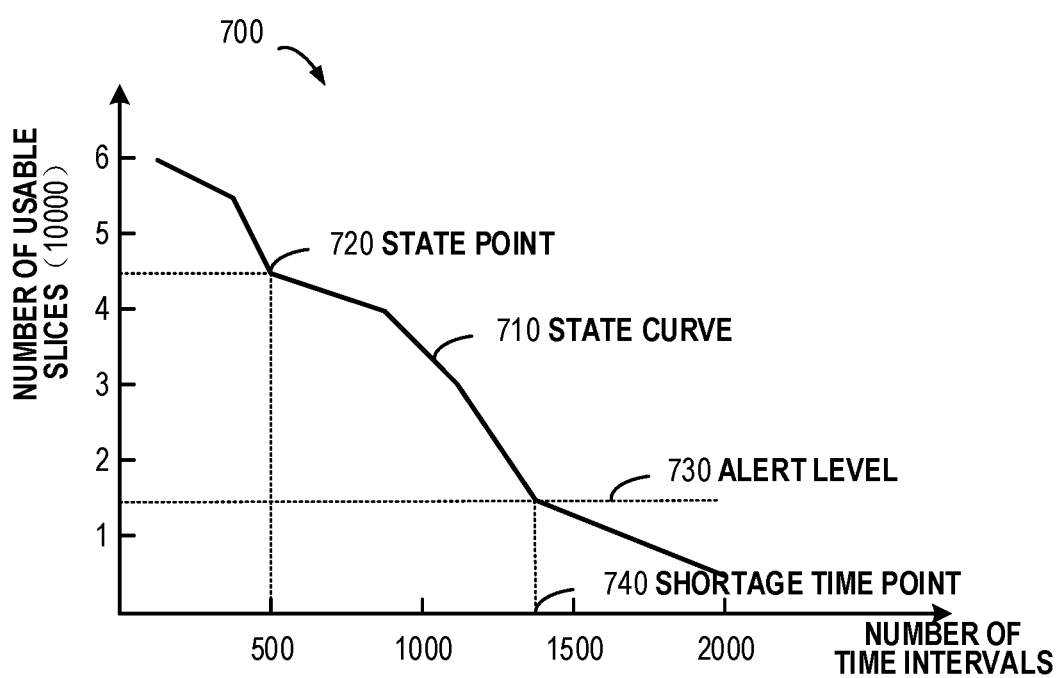
FIG. 7 schematically shows a block diagram of a state estimate of a storage system within a future time period as obtained from an association relationship according to example implementations of the present disclosure.

According to example implementations of the present disclosure, a state estimate for a future time period may further be obtained. For example, time points within the time period which are divided according to the predetermined time interval may be inputted into the association relationship 230, respectively, so as to obtain a state estimate corresponding to each time point. FIG. 7 schematically shows a block diagram 700 of a state estimate for the storage system in a future time period as obtained based on the association relationship according to example implementations of the present disclosure.

The horizontal axis in FIG. 7 indicates time represented as the number of time intervals, for example, a mark 500 denotes the $500^{th}$ time interval in the future, and a mark 2000 denotes the $2000^{th}$ time interval. Suppose the time interval is 1 hour, then the marks 500 and 2000 denote the $500^{th}$ hour and the $2000^{th}$ hour in the future, respectively. It will be understood that although the time axis is shown by the unit of the number of time intervals, the time axis may further be shown by the unit of time (e.g., hour, minute).

The vertical axis in FIG. 7 indicates a state estimate for usable storage space represented as the number of usable slices. For example, on the vertical axis, a mark 1 may represent that the number of existing usable slices is 10000, and a mark 6 may represent the number of existing usable slices is 60000. It will be understood that although FIG. 7 schematically shows the state estimate by the unit of the number of usable slices, the state estimate may further be represented by another unit. For example, the state estimate may be represented based on the size of usable storage space, the percentage of usable storage space, the percentage of used storage space, etc.

A future time period may be specified, e.g., from the $125^{th}$ hour to the $2000^{th}$ hour in the future. According to the above method, a time feature corresponding to each time point in the specified future time period according to the time interval may be determined. A state estimate corresponding to each time feature may be determined based on the association relationship 230. Subsequently, a state curve 710 may be generated based on a plurality of state estimates, as shown in FIG. 7. Each point on the state curve 710 may represent a state estimate at a certain time point. For example, a state point 720 on the state curve 710 may represent a state estimate at the future $500^{th}$ hour, at which point usable storage space in the storage system is 45000 slices. It will be understood a slice may have a predefined size. Therefore, the size of usable storage space may be determined based on the number of slices and the predefined size.

According to example implementations of the present disclosure, an alert level 730 may further be defined to indicate a shortage of storage space. For example, the alert level 730 may be set such that an alert is issued when the number of usable slices is equal to or lower than 15000. When the number of usable slices in the storage system is lower than the alert level 730, then an alert may be issued to prompt the user of the storage system to delete data which is no longer used, and/or prompt the administrator of the storage system to add another storage device to the storage system. With reference to FIG. 7, after the state curve 710 is determined based on the association relationship 230, a future shortage time point 740 corresponding to the shortage of storage space in the storage system may be determined based on an intersection of the state curve 710 and the alert level 730. In other words, after the shortage time point 740, a shortage of usable storage space might occur in the storage system.

It will be understood during the running process of the storage system 110, the speed at which the user uses storage space in the storage system 110 may vary. For example, a large amount of data might frequently be written to the storage system 110 in a certain time period, while few data might be written to the storage system 110 in another time period. At this point, if usage states of the storage system 110 are collected according to the same time interval, then usage states might differ too significantly or too slightly, and further the generated association relationship 230 cannot accurately reflect the speed at which usable storage space in the storage system is consumed.

According to example implementations of the present disclosure, the time interval used in collecting state data may be adjusted during the running of the storage system 110. Specifically, the difference between two consecutive state data in the group of state data may be determined. Suppose the group of state data includes d1, d2, d3, dn, then the difference between d1 and d2 may be determined, the difference between d2 and d3 may be determined, and so on and so forth. If dramatic variations occur in various differences, then the predetermined time interval may be adjusted. For example, the dramatic variation may indicate the predetermined time interval is not precise enough to reflect the speed at which storage space is consumed, so state data of the storage system 110 may be collected with finer granularity.

It will be understood that an excessively high collection frequency may cause the collection process to consume more resources and may cause more sample data to be processed in generating the association relationship 230, thereby leading to more computing resources and time overheads of the storage system 110. Therefore, when differences between various state data tend to be consistent with one another, the time interval may be increased. With example implementations of the present disclosure, overheads for collecting sample state data and generating the association relationship 230 may be reduced.

Description for predicting a future usage state based on historical usage states of the storage system 110 has been presented by taking one storage system 110 as an example. It will be understood the storage device pool where storage devices reside may include a large number of storage devices, and these storage devices may be used to build different storage systems, respectively. For example, the storage device pool may further include a further group of storage devices for building a further storage system. At this point, historical state data of the further storage system may be collected based on the above method 300, so as to build a further association relationship accordingly. According to example implementations of the present disclosure, a corresponding association relationship may be built for each storage system so as to be used to estimate a future usage state of each storage system.

According to example implementations of the present disclosure, a further state estimate for storage space in the further storage system at the specified time point is determined. A group of storage devices are selected from the group of storage devices and the further group of storage devices based on the state estimate and the further state estimate, and a backup storage device is added to the selected group of storage devices. Specifically, state estimates of the two storage systems may be compared, and a storage system whose storage space is to be exhausted earlier than the other storage system may be determined. A storage system that will be faced with a shortage of storage devices may be selected first, and preferably a new backup storage device may be added to this storage system.

With example implementations of the present disclosure, when there are a limited number of backup storage devices, it may be estimated in advance which storage system will be faced with a shortage of storage space, and then limited backup storage devices may be added to the storage system whose storage space is to be exhausted.

While examples of the methods according to the present disclosure have been described in detail with reference to FIGS. 2 to 7, description is presented below to the implementation of a corresponding apparatus. According to example implementations of the present disclosure, an apparatus is provided for managing storage space in a storage system. The apparatus includes: a collecting module configured to collect a group of state data of storage space in the storage system according to a predetermined time interval, respectively, the group of state data being collected at a group of time points, respectively, and the group of time points being divided according to the predetermined time interval; a comparing module configured to compare the group of state data with a threshold condition of the storage system, the threshold condition represents that storage space in the storage system is to be exhausted; a generating module configured to generate an association relationship between a state of storage space in the storage system and a future time point based on the group of state data in accordance with determining that at least one state data in the group of state data satisfies the threshold condition; and an obtaining module configured to obtain a state estimate of storage space in the storage system at a specified future time point based on the generated association relationship.

According to example implementations of the present disclosure, the generating module includes: a feature generating module configured to generate a group of time features based on the group of time points, respectively; and a training module configured to train the association relationship based on the generated group of time features and the group of state data, so that a group of state estimates of storage space in the storage system as obtained based on the trained association relationship and the group of time features match the group of state data.

According to example implementations of the present disclosure, the feature generating module is further configured to determine a time feature corresponding to the specified future time point; and the obtaining module includes: a state obtaining module configured to obtain the state estimate associated with the time feature based on the determined time feature and the association relationship.

According to example implementations of the present disclosure, the collecting module includes: an amount obtaining module configured to obtain a predetermined amount of the group of state data; a first collecting module configured to, in accordance with determining an amount of the group of state data is lower than the predetermined amount, continue collecting a state of storage space in the storage system according to the predetermined time interval; and add the collected state of the storage space to the group of state data.

According to example implementations of the present disclosure, the collecting module further includes: a second collecting module configured to, in accordance with determining the amount of the group of state data is equal to the predetermined amount, continue collecting a state of storage space in the storage system according to the predetermined time interval; and update the group of state data based on a first-in first-out rule by using the collected state of the storage space.

According to example implementations of the present disclosure, an updating module is further comprised, which is configured to update the association relationship based on the updated group of state data.

According to example implementations of the present disclosure, the apparatus further includes: a stopping module configured to stop updating the association relationship in accordance with determining none of state data in the group of state data satisfies the threshold condition.

According to example implementations of the present disclosure, the apparatus further includes: a difference determining module configured to determine a difference between two consecutive state data in the group of state data; and an adjusting module configured to adjust the time interval according to the determined difference.

According to example implementations of the present disclosure, the apparatus further includes: a shortage determining module configured to determine a future shortage time point corresponding to a shortage of storage space in the storage system based on the association relationship.

According to example implementations of the present disclosure, the storage system includes a group of storage devices in a storage device pool, the storage device pool further including a further group of storage devices for a further storage system, the determining module is further configured to determine a further state estimate of storage space in the further storage system at the specified future time point.

According to example implementations of the present disclosure, the apparatus further includes: a selecting module configured to select a group of storage devices from the group of storage devices and the further group of storage devices based on the state estimate and the further state estimate; and an adding module configured to add a backup storage device to the selected group of storage devices.

Figure 8:
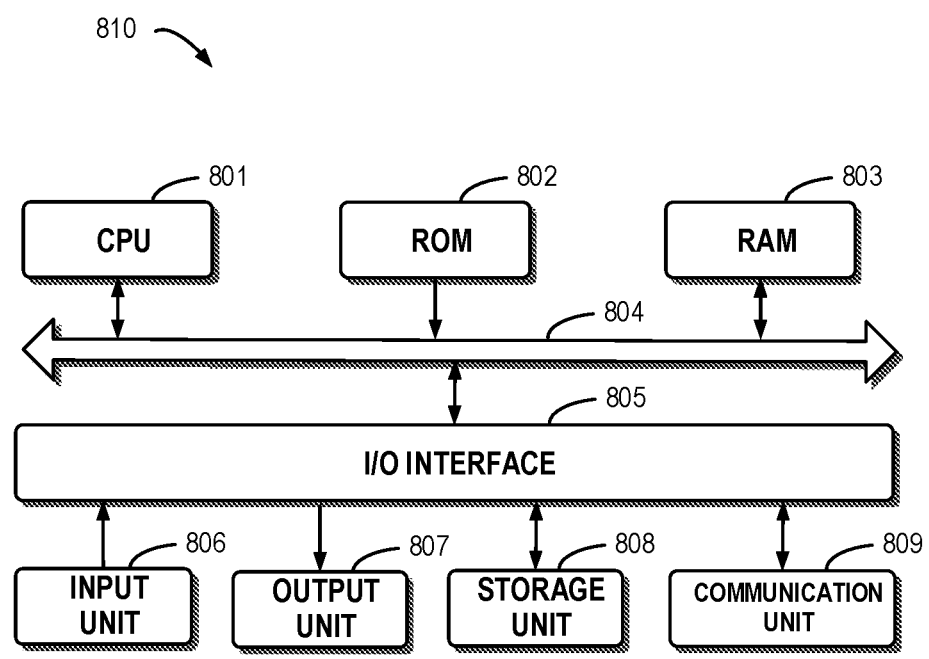
FIG. 8 schematically shows a block diagram of a device for managing storage space in a storage system according to example implementations of the present disclosure.

FIG. 8 schematically shows a block diagram of a device 800 for managing a storage system according to example implementations of the present disclosure. As depicted, the device 800 includes a central processing unit (CPU) 801, which can execute various suitable actions and processing based on the computer program instructions stored in the read-only memory (ROM) 802 or computer program instructions loaded in the random-access memory (RAM) 803 from a storage unit 808. The RAM 803 can also store all kinds of programs and data required by the operations of the device 800. CPU 801, ROM 802 and RAM 803 are connected to each other via a bus 804. The input/output (I/O) interface 805 is also connected to the bus 804.

A plurality of components in the device 800 are connected to the I/O interface 805, including: an input unit 806, such as a keyboard, mouse and the like; an output unit 807, e.g., various kinds of displays and loudspeakers etc.; a storage unit 808, such as a magnetic disk and optical disk, etc.; and a communication unit 809, such as a network card, modem, wireless transceiver and the like. The communication unit 809 allows the device 800 to exchange information/data with other devices via the computer network, such as Internet, and/or various telecommunication networks.

The above described process and treatment, such as the method 300 can also be executed by the processing unit 801. For example, in some implementations, the method 300 can be implemented as a computer software program tangibly included in the machine-readable medium, e.g., the storage unit 808. In some implementations, the computer program can be partially or fully loaded and/or mounted to the device 800 via ROM 802 and/or the communication unit 809. When the computer program is loaded to the RAM 803 and executed by the CPU 801, one or more steps of the above described method 300 can be implemented. Alternatively, in other implementations, the CPU 801 can also be configured in other suitable manners to realize the above procedure/method.

According to example implementations of the present disclosure, a device is provided for managing storage space in a storage system. The device includes: at least one processor; and a memory coupled to the at least one processor, the memory having instructions stored thereon, the instructions, when executed by the at least one processor, causing the device to perform acts. The acts include: collecting a group of state data of storage space in the storage system according to a predetermined time interval, respectively, the group of state data being collected at a group of time points, respectively, and the group of time points being divided according to the predetermined time interval; comparing the group of state data with a threshold condition of the storage system, the threshold condition represents that storage space in the storage system is to be exhausted; generating an association relationship between a state of storage space in the storage system and a future time point based on the group of state data in accordance with determining that at least one state data in the group of state data satisfies the threshold condition; and obtaining a state estimate of storage space in the storage system at a specified future time point based on the generated association relationship.

According to example implementations of the present disclosure, generating the association relationship between the state of storage space in the storage system and the future time point based on the group of state data includes: generating a group of time features based on the group of time points, respectively; and training the association relationship based on the generated group of time features and the group of state data, so that a group of state estimates of storage space in the storage system as obtained based on the trained association relationship and the group of time features match the group of state data.

According to example implementations of the present disclosure, obtaining the state estimate of storage space in the storage system at the specified future time point based on the generated association relationship includes: determining a time feature corresponding to the specified future time point; and obtaining the state estimate associated with the time feature based on the determined time feature and the association relationship.

According to example implementations of the present disclosure, collecting the group of state data of storage space in the storage system according to the predetermined time interval, respectively includes: obtaining a predetermined amount of the group of state data; in accordance with determining an amount of the group of state data is lower than the predetermined amount, continuing collecting a state of storage space in the storage system according to the predetermined time interval; and adding the collected state of the storage space to the group of state data.

According to example implementations of the present disclosure, the acts further include: in accordance with determining the amount of the group of state data is equal to the predetermined amount, continuing collecting a state of storage space in the storage system according to the predetermined time interval; and updating the group of state data based on a first-in first-out rule by using the collected state of the storage space.

According to example implementations of the present disclosure, the acts further include: updating the association relationship based on the updated group of state data.

According to example implementations of the present disclosure, the acts further include: stopping updating the association relationship in accordance with determining none of state data in the group of state data satisfies the threshold condition.

According to example implementations of the present disclosure, the acts further include: determining a difference between two consecutive state data in the group of state data; and adjusting the time interval according to the determined difference.

According to example implementations of the present disclosure, the acts further include: determining a future shortage time point corresponding to a shortage of storage space in the storage system based on the association relationship.

According to example implementations of the present disclosure, the storage system includes a group of storage devices in a storage device pool, the storage device pool further includes a further group of storage devices for a further storage system, and the acts further includes: determining a further state estimate of storage space in the further storage system at the specified future time point; selecting a group of storage devices from the group of storage devices and the further group of storage devices based on the state estimate and the further state estimate; and adding a backup storage device to the selected group of storage devices.

According to example implementations of the present disclosure, there is provided a computer program product. The computer program product is tangibly stored on a non-transitory computer-readable medium and includes machine-executable instructions which are used to implement the method according to the present disclosure.

According to example implementations of the present disclosure, there is provided a computer-readable medium. The computer-readable medium has machine-executable instructions stored thereon, the machine-executable instructions, when executed by at least one processor, causing the at least one processor to implement the method according to the present disclosure.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to implementations of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable others of ordinary skill in the art to understand implementations of the present disclosure.

We claim:

1. A method for managing storage space in a storage system, the method comprising:
    collecting a group of state data of storage space in the storage system according to a predetermined time interval, respectively, the group of state data being collected at a group of time points, respectively, the group of time points being divided according to the predetermined time interval, each of the state data in the group of state data being configured for transmission across a network, and the collecting of the group of state data including receiving the group of state data transmitted over the network;
    comparing the group of state data with a threshold condition of the storage system, the threshold condition represents that storage space in the storage system is to be exhausted;
    generating an association relationship between a state of storage space in the storage system and a future time point based on the group of state data in accordance with determining at least one state data in the group of state data satisfies the threshold condition; and
    obtaining a state estimate of storage space in the storage system at a specified future time point based on the generated association relationship.

2. The method of claim 1, wherein generating the association relationship between the state of storage space in the storage system and the future time point based on the group of state data comprises:
    generating a group of time features based on the group of time points, respectively; and
    training the association relationship based on the generated group of time features and the group of state data, so that a group of state estimates of storage space in the storage system as obtained based on the trained association relationship and the group of time features match the group of state data.

3. The method of claim 2, wherein obtaining the state estimate of storage space in the storage system at the specified future time point based on the generated association relationship comprises:
    determining a time feature corresponding to the specified future time point; and
    obtaining the state estimate associated with the time feature based on the determined time feature and the association relationship.

4. The method of claim 1, wherein collecting the group of state data of storage space in the storage system according to the predetermined time interval, respectively comprises:
    obtaining a predetermined amount of the group of state data;
    in accordance with determining an amount of the group of state data is lower than the predetermined amount,
    continuing collecting a state of storage space in the storage system according to the predetermined time interval; and
    adding the collected state of the storage space to the group of state data.

5. The method of claim 4, further comprising:
    in accordance with determining the amount of the group of state data is equal to the predetermined amount,
    continuing collecting a state of storage space in the storage system according to the predetermined time interval; and
    updating the group of state data based on a first-in first-out rule by using the collected state of the storage space.

6. The method of claim 5, further comprising:
    updating the association relationship based on the updated group of state data.

7. The method of claim 6, further comprising:
    stopping updating the association relationship in accordance with determining none of state data in the group of state data satisfies the threshold condition.

8. The method of claim 1, further comprising:
    determining a difference between two consecutive state data in the group of state data; and
    adjusting the time interval according to the determined difference.

9. The method of claim 1, further comprising:
    determining a future shortage time point corresponding to a shortage of storage space in the storage system based on the association relationship.

10. The method of claim 1, wherein the storage system comprises a group of storage devices in a storage device pool, the storage device pool further comprising a further group of storage devices for a further storage system, the method further comprises:
    determining a further state estimate of storage space in the further storage system at the specified future time point;
    selecting a group of storage devices from the group of storage devices and the further group of storage devices based on the state estimate and the further state estimate; and
    adding a backup storage device to the selected group of storage devices.

11. A device for managing storage space in a storage system, the device comprising:
    at least one processor; and
    a memory coupled to the at least one processor and having instructions stored thereon, the instructions, when executed by the at least one processor, causing the device to perform acts, comprising:
        collecting a group of state data of storage space in the storage system according to a predetermined time interval, respectively, the group of state data being collected at a group of time points, respectively, the group of time points being divided according to the predetermined time interval, each of the state data in the group of state data being configured for transmission across a network, and the collecting of the group of state data including receiving the group of state data transmitted over the network;

comparing the group of state data with a threshold condition of the storage system, the threshold condition represents that storage space in the storage system is to be exhausted;

generating an association relationship between a state of storage space in the storage system and a future time point based on the group of state data in accordance with determining at least one state data in the group of state data satisfies the threshold condition; and obtaining a state estimate of storage space in the storage system at a specified future time point based on the generated association relationship.

12. The device of claim 11, wherein generating the association relationship between the state of storage space in the storage system and the future time point based on the group of state data comprises:

generating a group of time features based on the group of time points, respectively; and training the association relationship based on the generated group of time features and the group of state data, so that a group of state estimates of storage space in the storage system as obtained based on the trained association relationship and the group of time features match the group of state data.

13. The device of claim 12, wherein obtaining the state estimate of storage space in the storage system at the specified future time point based on the generated association relationship comprises:

determining a time feature corresponding to the specified future time point; and obtaining the state estimate associated with the time feature based on the determined time feature and the association relationship.

14. The device of claim 11, wherein collecting the group of state data of storage space in the storage system according to the predetermined time interval, respectively comprises:

obtaining a predetermined amount of the group of state data;

in accordance with determining an amount of the group of state data is lower than the predetermined amount, continuing collecting a state of storage space in the storage system according to the predetermined time interval; and adding the collected state of the storage space to the group of state data.

15. The device of claim 14, wherein the acts further comprise:

in accordance with determining the amount of the group of state data is equal to the predetermined amount, continuing collecting a state of storage space in the storage system according to the predetermined time interval; and updating the group of state data based on a first-in first-out rule by using the collected state of the storage space.

16. The device of claim 15, wherein the acts further comprise:

updating the association relationship based on the updated group of state data.

17. The device of claim 16, wherein the acts further comprise:

stopping updating the association relationship in accordance with determining none of state data in the group of state data satisfies the threshold condition.

18. The device of claim 11, wherein the acts further comprise:

determining a difference between two consecutive state data in the group of state data; and adjusting the time interval according to the determined difference.

19. The device of claim 11, wherein the acts further comprise:

determining a future shortage time point corresponding to a shortage of storage space in the storage system based on the association relationship.

20. A computer program product having a non-transitory computer readable medium which stores a set of instructions to manage storage space in a storage system; the set of instructions, when carried out by computerized circuitry, causing the computerized circuitry to perform a method of:

collecting a group of state data of storage space in the storage system according to a predetermined time interval, respectively, the group of state data being collected at a group of time points, respectively, the group of time points being divided according to the predetermined time interval, each of the state data in the group of state data being configured for transmission across a network, and the collecting of the group of state data including receiving the group of state data transmitted over the network;

comparing the group of state data with a threshold condition of the storage system, the threshold condition represents that storage space in the storage system is to be exhausted;

generating an association relationship between a state of storage space in the storage system and a future time point based on the group of state data in accordance with determining at least one state data in the group of state data satisfies the threshold condition; and obtaining a state estimate of storage space in the storage system at a specified future time point based on the generated association relationship.

* * * * *